(12) United States Patent
Pleunis et al.

(10) Patent No.: US 6,790,529 B2
(45) Date of Patent: Sep. 14, 2004

(54) MULTIMODE FIBER HAVING A REFRACTIVE INDEX PROFILE

(75) Inventors: Peter Johannes Theodorus Pleunis, Weert (NL); Myrna Boon, Eindhoven (NL); Martinus Ludovicus Petrus Wilhelmus Van Den Heuvel, Waalre (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 10/363,262

(22) PCT Filed: Sep. 19, 2002

(86) PCT No.: PCT/NL02/00604
§ 371 (c)(1),
(2), (4) Date: Sep. 4, 2003

(87) PCT Pub. No.: WO03/025645
PCT Pub. Date: Mar. 27, 2003

(65) Prior Publication Data
US 2004/0028360 A1 Feb. 12, 2004

(30) Foreign Application Priority Data
Sep. 20, 2001 (NL) ............................. 1019004

(51) Int. Cl.$^7$ ............................. D02G 3/00; G02B 6/00; G02B 6/16
(52) U.S. Cl. ..................... 428/391; 385/123; 385/141; 385/145; 65/415
(58) Field of Search ................................ 385/123, 141; 65/415; 428/391

(56) References Cited

FOREIGN PATENT DOCUMENTS

| NL | 10103944 | * 12/1999 |
|----|----------|-----------|
| WO | 00 50936 | 8/2000 |

* cited by examiner

Primary Examiner—N. Edwards
(74) Attorney, Agent, or Firm—Oblon, Spivak, McClelland, Maier & Neustadt, P.C.

(57) ABSTRACT

The present invention relates to a multimode fiber having a refractive index profile, wherein the area surrounding the center of the fiber has a refractive index profile such that the responses of a DMD (Differential Mode Delay) measurement carried out on a fiber having a length of at least 300 m are obtained without any pulse splitting occurring in the center of the fiber.

17 Claims, 2 Drawing Sheets

FIGURE 1  PRIOR ART
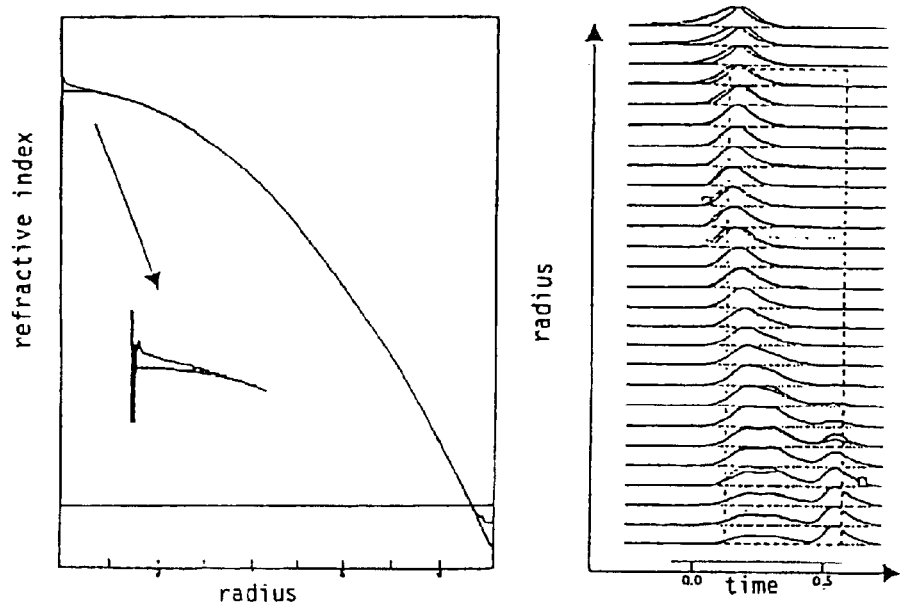
FIGURE 2  PRIOR ART
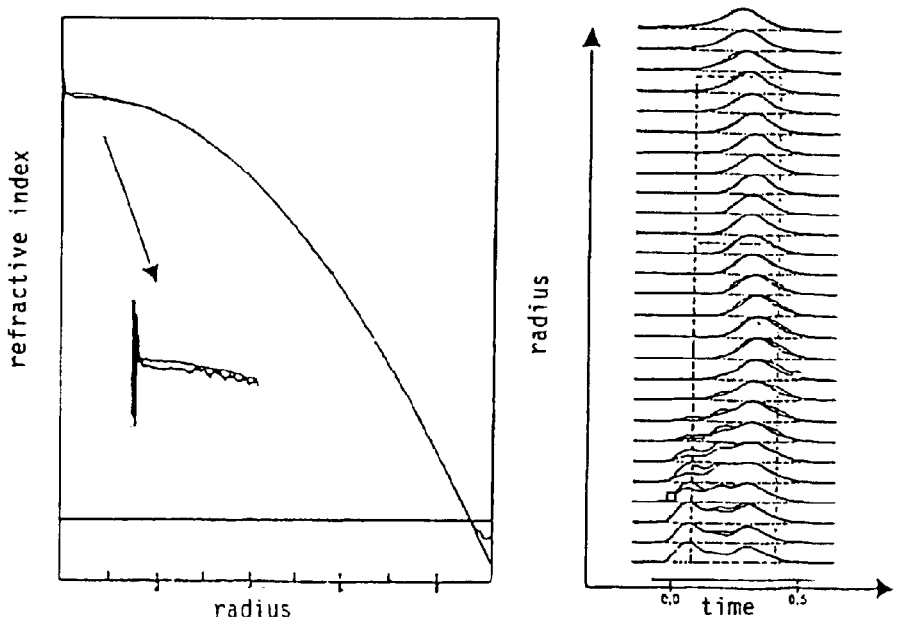

MULTIMODE FIBER HAVING A REFRACTIVE INDEX PROFILE

DESCRIPTION

The present invention relates to a multimode fibre having a refractive index profile, and also to a method of manufacturing the same.

From International patent application WO 00/50936 there is known a multimode fibre and a method of manufacturing the same, which multimode fibre has a core area of 62.5 $\mu$m and a non-linear DMD profile which, if measured at a wavelength of 1300 nm, comprises a first average slope, measured over a first region, of $(r/a)^2=0.0-0.25$, and a second average slope, measured over a second region, from $(r/a)^2=0.25$ to 0.50, in which the first average slope is greater than the second average slope. The multimode fibre that is known from said document has been manufactured by means of Outside Vapor Deposition (OVD). Further details on pulse splitting are not given in said document.

The multimode fibre as referred to in the introduction is known per se from U.S. Pat. No. 4,793,843. Said document describes a method of manufacturing a preform, from which preform optical fibres are drawn, in which the preform has a refractive index profile which exhibits hardly any disturbance. Upon manufacture of such a preform, the hollow substrate tube is heated along the entire length thereof, with the heating element being reciprocated at a uniform speed along the length of the rotating substrate tube, after glass layers have been deposited on the inner surface. Under the influence of the surface tension of the softened substrate tube material, the diameter of the substrate tube gradually decreases until the substrate tube closes entirely, thus providing a preform in the form of a massive bar, from which an optical fibre is a drawn by heating one end thereof. A dopant which is generally used in the manufacture of optical fibres from quartz glass is germanium dioxide ($GeO_2$). When a hollow substrate tube containing quartz glass doped with a slightly volatile dopant, for example germanium dioxide, is subjected to contraction, part of the dopant may evaporate from the glass layers that have been deposited last. This results in a disturbance in the refractive index profile, which disturbance has an adverse effect on the bandwidth of the optical fibre. According to said U.S. patent specification it has appeared that the so-called dip in the refractive index profile of optical fibres can be prevented if, at the moment of closing of the hollow substrate tube, a gaseous etchant is passed through the substrate tube, which is still hollow at that point, so as to obtain a massive bar.

For the new generation of optical fibres, the transmission of large amounts of data is of major importance, and it is desirable to manufacture multimode fibres for so-called 10-gigabit or >2.5 Gb Ethernet systems which have a refractive index profile which is free from disturbances. Such special profile disturbances in a multimode fibre lead to an undesirable disturbance of the light passing through the fibre.

The object of the present invention is to provide a multimode fibre which is free from disturbances in the refractive index profile thereof.

According to the present invention, the multimode fibre as referred to in the introduction is characterized in that the area surrounding the centre of the fibre has a refractive index profile such that the responses of a DMD (Differential Mode Delay) measurement carried out on a fibre having a length of at least 300 m are obtained without any pulse splitting occurring in the centre of the fibre.

Experiments carried out by the present inventors have shown that the centre of the fibre is of major importance as regards the suitability of a multimode fibre for high-speed data transmission. The suitability of a multimode fibre for high-speed data transmission is evaluated by means of a so-called DMD (Differential Mode Delay) measurement, in which the transmission of a light pulse is measurement at several radial positions through the core of the optical fibre. A fibre length of 300 m is a length which is generally used as the maximum length in practice. Moreover, the amount of fibre waste will be small when a DMD measurement is carried out on a fibre of such length.

It is preferred to carry out the DMD measurement by means of a laser at a wavelength of 850 nm and a short pulse duration and a small spectral width, in which a so-called single mode fibre is used for irradiating the multimode fibre to be measured. If a multimode fibre exhibits a small deviation in the central part of the ideal refractive index profile, pulse widening or a so-called double pulse in the DMD curve will be observed. As a result of said pulse widening, light will pass through that part of the core of the fibre at varying speeds, which is undesirable.

It is desirable for the multimode fibre that is used in the present invention to have a refractive index profile in accordance with the following equation:

$$n(r)=n_1[1-2\Delta(r/a)^\alpha]^{1/2}$$

wherein:
  $n_1$=the refractive index value of the centre of the fibre
  r=the radial position in the fibre ($\mu$m)
  $\Delta$=the refractive index contrast of the fibre
  $\alpha$=the profile shape parameter
  a=the radius of the fibre ($\mu$m)

The profile shape parameter $\alpha$ determines the wavelength at which the maximum bandwidth of the fibre is measured. In the case of a higher $\alpha$-value, the maximum bandwidth is measured at a lower wavelength. Changing the $\alpha$-value in this manner makes it possible to optimise the bandwidth of a fibre at a particular wavelength. For the next generation of optical fibres, in particular fibres having a radius of more than 20 $\mu$m, the profile shape parameter $\alpha$ is changed so as to optimise the bandwidth of the fibre at a wavelength of 850 nm. A very precise $\alpha$-profile can be obtained by depositing layers having a precisely defined refractive index value on the interior of the hollow substrate tube. The present multimode fibre preferably has a core having a diameter of 50 $\mu$m.

The present invention further relates to a method of manufacturing a multimode fibre as defined in the appended claims.

The method for manufacturing the present multimode fibre is known per se from Dutch patent NL 1013944 to the present applicant, whose contents can be considered to be fully incorporated therein. The method that is known from said patent relates to a method of depositing glass layers, which may or may not be doped, on the interior of a substrate tube by means of a chemical vapour deposition (CVD) technique using a reactive gas mixture, so as to obtain a preform having a precisely define refractive index profile, which method comprises the steps of:

a) determining the desired refractive index profile of the preform to be manufactured,
  b) precisely adjusting both the composition and the supply rate of the reactive gas mixture for manufacturing the intended preform in conformity with the refractive index profile determined in step a), c) introducing the reactive gas mixture, under the conditions adjusted in step b), into the substrate tube and effecting a reaction therein so as to achieve deposition of the glass-forming oxides onto the interior of the substrate tube, d) contracting the substrate tube obtained from the deposition process of step c) into a preform and subsequently subjecting said preform to a refractive index profile measurement, e) comparing the refractive index profile determined in step a) with the refractive index profile measured in step d), and f) correcting the differences in refractive index profiles measured in step e) by adapting the composition of the reactive gas mixture as a function of time during the subsequent deposition process.

Using the aforesaid steps a)-f), it is possible to obtain precisely defined refractive index profiles in a preform, in which there is feedback of the refractive index profile measurement in the final preform and the gas dosage used in the deposition process. The results of the refractive index profile measurement as obtained in step d) are used for adjusting the production process in step c) for manufacturing the preform. On the basis of the refractive index profile measurement obtained in step d) it is thus possible according to the aforesaid invention to determine the extent to which the process, in particular the composition of the reactive gas mixture, is to be adjusted in order to approach the desired refractive index profile of step a) as nearly as possible. After both the composition and the supply rate of the reactive gas mixture have been precisely adjusted in accordance with step b) of the aforesaid invention, the deposition process according to step c) is carried out. Once the deposition process according to step c) has been terminated, the preform thus obtained is subjected to a refractive index profile measurement in step d). The refractive index profile measured in step d) is then compared with the refractive index profile determined in step a), after which a correction of the differences in the refractive index profiles measured in step e) may take place in step f) by adapting the composition of the reactive gas mixture thereto as a function of time during the subsequent deposition process. It should be understood that the correction carried out in step f) may require that the composition of the reactive gas mixture be adapted continuously during the subsequent deposition process. If the differences in refractive index profiles that are measured in step e) are acceptable within specific tolerances, however, no correction of the composition of the reactive gas mixture will take place during the subsequent deposition process. Correction will only take place when the differences measured in step e) exceed a specific tolerance range.

The PCVD process as described above makes it possible to manufacture a multimode fibre having a refractive index profile, in which the core is composed of several thousand layers. The refractive index value can be changed for each of said layers, which results in a very precise α-profile.

In developing the next generation of fibres, the present inventors have found that the area around the centre of a fibre, which has a diameter of 1–6 μm, is of major importance in preventing the occurrence of pulse splitting in the centre of a fibre when carrying out a DMD measurement, which measurement takes place at a wavelength of 850 nm with an irradiation MFD (Mode Field Diameter) of <6 μm.

The present invention will be explained hereinafter by means of a number of examples and figures, which do not constitute a limitation of the present invention in any way.

FIG. 1 shows the refractive index profile and the results of the DMD measurement of an optical fibre according to the prior art.

FIG. 2 shows the refractive index profile and the results of the DMD measurement of another optical fibre known from the prior art.

Figure 3:
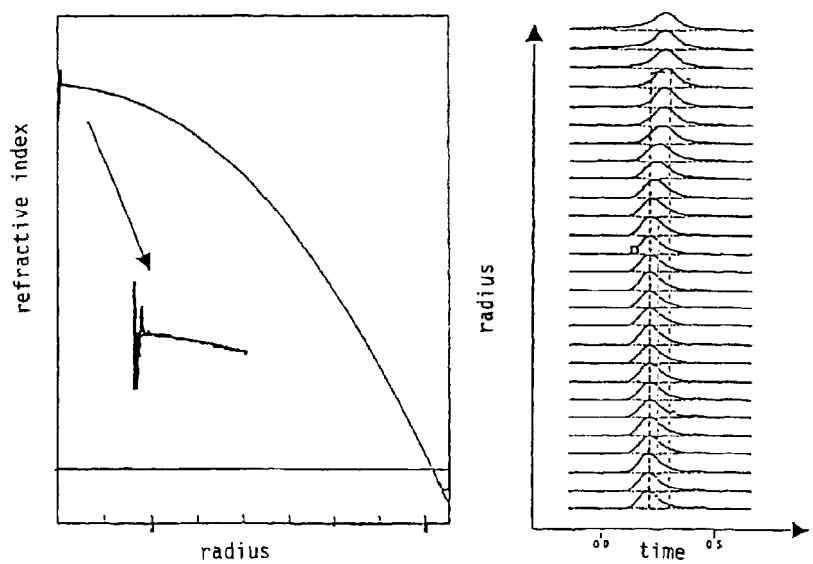
FIG. 3 shows the refractive index profile and the results of the DMD measurement of a multimode fibre according to the present invention.

FIG. 1 shows half of the refractive index profile of the fibre according to the prior art on the left-hand side, whilst also the ideal α-profile according to the above formula is depicted. An increase of the deviation of the refractive index value is shown to be present in the area surrounding the centre of the fibre. On the right-hand side, FIG. 1 shows the results of the DMD measurement, in which the X-axis represents time and the Y-axis represents the various measurements at various positions along the core of the fibre. The lower pulse is the measurement exactly in the centre of the fibre, and the other pulses are measurements in steps of −1 and 1 μm through the core, with the upper line thus indicating the measurement at a distance of 26 μm from the core. FIG. 1 clearly shows that the deviation in the refractive index value of the ideal α-profile becomes greater near the centre of the fibre, so that a bulge in the refractive index profile can be observed. From the results of the DMD measurement it follows that said bulge results in a significant pulse widening or pulse splitting around the centre of the core. This increase in the refractive index value causes a deceleration in the light passing through this part of the core.

FIG. 2 schematically shows the refractive index profile of a fibre according to the prior art having the same dimension as used in FIG. 1, with pulse splitting taking place in the DMD measurements in this case as well. The refractive index profile clearly shows that the measured refractive index value is lower than the ideal α-profile in the centre of the core, and as a result of said lower refractive index value the light will pass at a greater speed through this part of the fibre. The present inventors suggest that this serious case of pulse splitting was not caused by the central dip resulting from the contraction of the hollow substrate tube into a massive bar, but by disturbances in the refractive index value in the area surrounding the centre of the core, which refractive index area can be precisely corrected by using the PCVD process as known from Dutch patent NL 1013944.

FIG. 3 shows the refractive index profile and the results of the DMD measurement of the present multimode fibre, which fibre has been obtained by using the method as known from Dutch patent NL 1013944. Since the measured refractive index profile substantially corresponds to the ideal α-profile, in which there is no disturbing deviation, the responses of the DMD measurement do not exhibit any pulse splitting or pulse widening at any position in the area surrounding the core of the present multimode fibre. When such a fibre is used, a transmission rate of >2.5 Gb/s over a length of at least 300 m of this fibre is possible.

What is claimed is:

1. A multimode fibre comprising:
    an area surrounding a centre of the fibre having a refractive index profile such that the responses of a Differential Mode Delay (DMD) measurement carried out on a fibre having a length of at least 300 m are obtained without any pulse splitting occurring in the centre of the fibre.

2. A multimode fibre according to claim 1, characterized in that the refractive index profile is in accordance with the following equation:

$$n(r) = n_1[1 - 2\Delta(r/a)^\alpha]^{1/2}$$

wherein:
n$_1$=the refractive index value of the centre of the fibre
r=the radial position in the fibre ($\mu$m)
$\Delta$=the refractive index contrast of the fibre
$\alpha$=the profile shape parameter
a=the radius of the fibre ($\mu$m).

3. A multimode fiber according to claim 1, characterized in that the DMD measurement is carried out at a wavelength of 850 nm with an irradiation MFD (Mode Field Diameter) of <6 $\mu$m.

4. A multimode fiber according to claim 1, characterized in that the area around the centre of a fibre has a diameter of 1–6 $\mu$m.

5. A multimode fiber according to claim 1, characterized in that the core has a diameter of 50 $\mu$m.

6. A method of manufacturing a multimode fibre, comprising:
depositing a refractive index profile, wherein glass layers may or may not be doped, on the interior of a substrate tube by means of a chemical vapour deposition technique, such that a reactive gas mixture, is used so as to obtain a perform having a precisely defined refractive index profile; and
drawing from a preform a multimode fibre by heating one end thereof, characterized in that the area surrounding the centre of the multimode fibre has a refractive index profile such that the responses of a DMD (Differential Mode Delay) measurement carried out on a fibre having a length of at least 300 m are obtained without any pulse splitting occurring in the centre of the fibre.

7. A multimode fiber according to claim 2, characterized in that the DMD measurement is carried out at a wavelength of 850 nm with an irradiation MFD (Mode Field Diameter) of <6 $\mu$m.

8. A multimode fiber according to claim 2, characterized in that the area around the centre of a fibre has a diameter of 1–6 $\mu$m.

9. A multimode fiber according to claim 3, characterized in that the area around the centre of a fibre has a diameter of 1–6 $\mu$m.

10. A multimode fiber according to claim 7, characterized in that the area around the centre of a fibre has a diameter of 1–6 $\mu$m.

11. A multimode fiber according to claim 2, characterized in that the core has a diameter of 50 $\mu$m.

12. A multimode fiber according to claim 3, characterized in that the core has a diameter of 50 $\mu$m.

13. A multimode fiber according to claim 4, characterized in that the core has a diameter of 50 $\mu$m.

14. A multimode fiber according to claim 7, characterized in that the core has a diameter of 50 $\mu$m.

15. A multimode fiber according to claim 8, characterized in that the core has a diameter of 50 $\mu$m.

16. A multimode fiber according to claim 9, characterized in that the core has a diameter of 50 $\mu$m.

17. A multimode fiber according to claim 10, characterized in that the core has a diameter of 50 $\mu$m.

* * * * *